United States Patent
Baessler et al.

(10) Patent No.: US 9,547,663 B2
(45) Date of Patent: Jan. 17, 2017

(54) DATA DE-DUPLICATION (71) Applicant: International Business Machines Corporation, Armonk, NY (US)

(72) Inventors: Michael Baessler, Neckartenzlingen (DE); Peng Hui Jiang, Beijing (CN); Pi Jun Jiang, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 191 days.

(21) Appl. No.: 14/259,506

(22) Filed: Apr. 23, 2014

(65) Prior Publication Data
US 2014/0317067 A1 Oct. 23, 2014

(30) Foreign Application Priority Data
Apr. 23, 2013 (GB) .................................. 1307333.3

(51) Int. Cl.
*G06F 17/00* (2006.01)
*G06F 17/30* (2006.01)

(52) U.S. Cl.
CPC .............................. *G06F 17/30156* (2013.01)

(58) Field of Classification Search
CPC ............ G06F 11/1453; G06F 17/30156; G06F 3/0641; G06F 3/0608; G06F 3/067; G06F 11/1464
See application file for complete search history.

(56) References Cited

U.S. PATENT DOCUMENTS

| 7,567,188 | B1 | 7/2009 | Anglin et al. |
| 7,925,683 | B2 | 4/2011 | Jain et al. |
| 8,140,491 | B2 | 3/2012 | Mandagere et al. |
| 8,266,115 | B1 | 9/2012 | Park et al. |
| 2003/0031236 | A1* | 2/2003 | Dahlman ............. H04B 1/7115 375/147 |
| 2005/0182780 | A1* | 8/2005 | Forman ............. G06F 17/30489 |
| 2010/0325093 | A1 | 12/2010 | Bates et al. |
| 2011/0016091 | A1 | 1/2011 | Prahlad et al. |
| 2011/0071989 | A1 | 3/2011 | Wilson et al. |
| 2011/0196900 | A1 | 8/2011 | Drobychev et al. |

(Continued)

FOREIGN PATENT DOCUMENTS

WO 2010033961 A1 3/2010

OTHER PUBLICATIONS

Intellectual Property Office, Search Report, Application No. GB1307333.3, Oct. 22, 2013, 4 pages.

(Continued)

*Primary Examiner* — Truong Vo
(74) *Attorney, Agent, or Firm* — Cantor Colburn LLP; Farrokh Pourmirzaie (57) ABSTRACT

Disclosed are computer implemented methods, computer program products, and computer systems for storing a file into a storage system. An embodiment includes, responsive to a determination that a descriptive information describing content of a first file corresponds to a descriptive information describing content of a second file, that a format of the first file is convertible to a format of the second file using a transformation matrix, and that the format of the first file has a higher quality indicator value than the format of the second file, storing the first file into the storage system.

17 Claims, 4 Drawing Sheets

(56) References Cited

U.S. PATENT DOCUMENTS

2013/0018704 A1* 1/2013 Liu .................. G06F 17/30241
　　　　　　　　　　　　　　　　　　　　　　705/7.38
2013/0080404 A1 3/2013 Smith et al.

OTHER PUBLICATIONS

Paschalakis, S. et al., "Detection of Repeated Segments in Video Sequences", 2010 Digest of Technical Papers, International Conference on Consumer Electronics (ICCE 2010); pp. 315-316.
List of IBM Patents or Patent Applications Treated As Related—Date Filed: Apr. 28, 2014; 1 page.

* cited by examiner

DATA DE-DUPLICATION

PRIORITY

This application claims priority to Great Britain Application No. 1307333.3, filed Apr. 23, 2013, and all the benefits accruing therefrom under 35 U.S.C. §119, the contents of which are herein incorporated by reference in its entirety.

BACKGROUND

The invention relates to computing systems, and more particularly to a method for data de-duplication. With the increased demand on computer systems to store data and to improve storage utilization, data de-duplication becomes a key technique to eliminate redundant data and reduce the cost of network data transfer. In particular, data de-duplication techniques may have to deal with data provided in different data formats having the same content.

SUMMARY

Embodiments include a computer implemented method, a computer program product, and a computer system for storing a file into a storage system. An embodiment includes, responsive to a determination that descriptive information describing content of a first file corresponds to descriptive information describing content of a second file, that a format of the first file is convertible to a format of the second file using a transformation matrix, and that the format of the first file has a higher quality indicator value than the format of the second file, storing the first file into the storage system.

BRIEF DESCRIPTION OF THE SEVERAL VIEWS

In the following, preferred embodiments of the invention will be described in greater detail by way of example only making reference to the drawings in which.

DETAILED DESCRIPTION

In the following, like numbered elements in the figures either designate similar elements or designate elements that perform an equivalent function. Elements which have been discussed previously will not necessarily be discussed in later figures if the function is equivalent.

The term "file" as used herein refers to a collection of data stored in one unit, identified by a filename. It can be a document, picture, audio or video stream, data library, application, or other collection of data. The term "format" or "file format" refers to the structure and type of data stored in a file. The structure of a typical file may include a header, metadata, saved content, and an end-of-file (EOF) marker. The expression "converting a file format to another file format" or "converting a format to another format" refers to the conversion of a file from one format to the other format.

Figure 1:
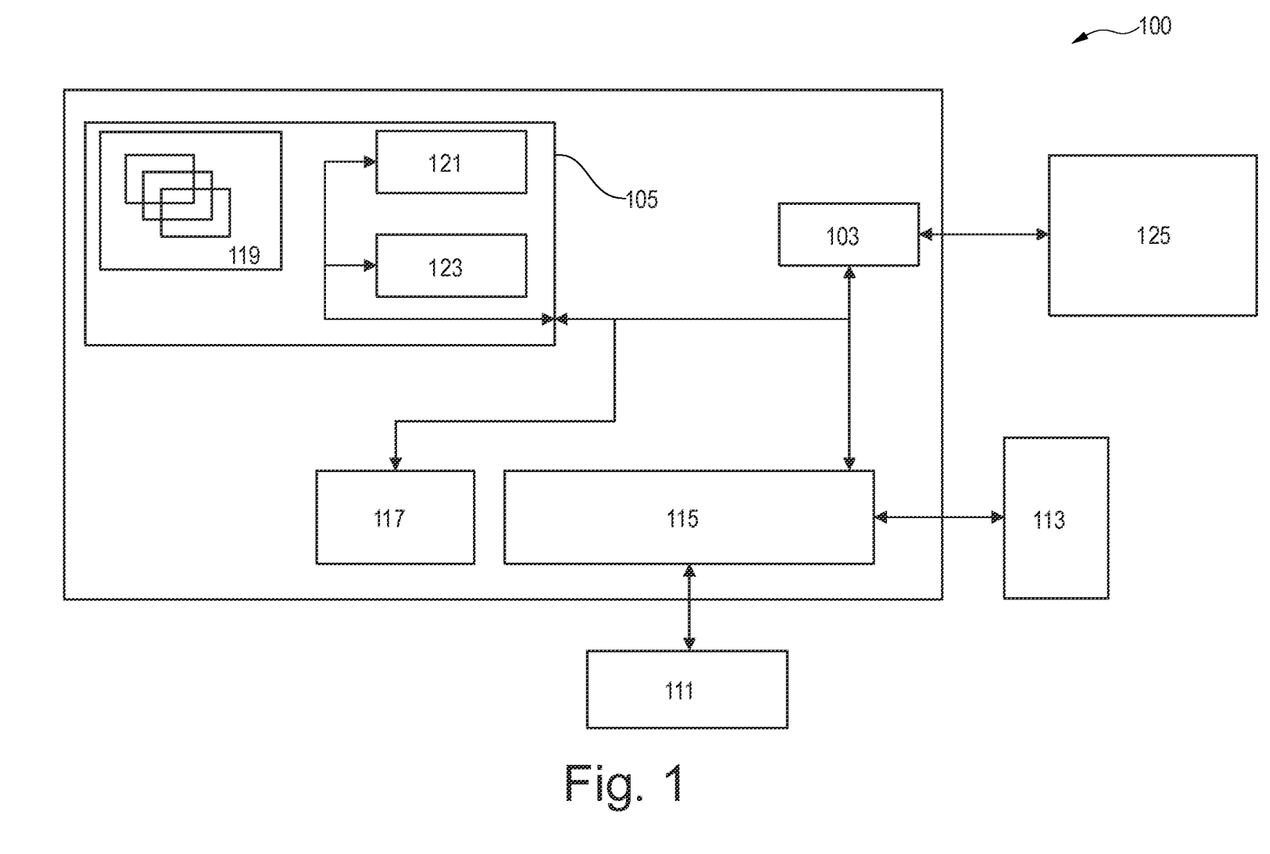
FIG. 1 shows computing system architecture.

FIG. 1 shows a schematic view of a computing system 100. Computing system 100 is only one example of a suitable computing system and is not intended to suggest any limitation as to the scope of use or functionality of the invention described herein.

In computing system 100 there is a computer device 101, which is operational with numerous other general purpose or special purpose computing system environments or configurations. Examples of well-known computing systems, environments, and/or configurations that may be suitable for use with computer device 101 include, but are not limited to, personal computer systems, server computer systems, thin clients, thick clients, hand-held or laptop devices, multiprocessor systems, microprocessor based systems, set top boxes, programmable consumer electronics, network personal computers (PCs), minicomputer systems, mainframe computer systems, and distributed cloud computing environments that include any of the above systems or devices, and the like.

In FIG. 1, computer device 101 is shown in the form of a general-purpose computing device. The components of computer device 101 may include, but are not limited to, one or more processors or processing units 103, a system memory 105, and a bus 107 that couples various system components including system memory 105 to processors 103. The processor's operation is controlled, in part, by information stored in the system memory 105, such as operating system software, application software 119, data, etc.

The system memory 105 may include computer system readable media in the form of volatile memory, such as random access memory (RAM) 121 and/or cache memory 123, a hard drive, etc.

Computer device 101 may also communicate with one or more external devices 111 such: as a keyboard; a pointing device; a display 113, etc.; one or more devices that enable a user to interact with computer device 101; and/or any devices (e.g., network card, modem, etc.) that enable computer device 101 to communicate with one or more other computing devices. Such communication can occur via I/O interface(s) 115.

Still yet, computer device 101 can communicate with one or more networks such as a local area network (LAN), a general wide area network (WAN), and/or a public network (e.g., the Internet) via network adapter 117. As depicted, network adapter 117 communicates with the other components of computer device 101 via bus 107.

The computing system 100 may further comprise a storage device 125. The storage device 125 may be part of the computer device 101. Alternatively, the storage device 125 may be part of a remote computing system which is connected to the computer device via a network, which may be a public network, such as the Internet, a private network, such as a wide area network (WAN), or a combination thereof.

The storage device 125 may be a network-attached storage (NAS) device or a dynamically scalable storage such as remote hard disks. It may be provided as a service over a public network (e.g., the Internet) or a private network (e.g., a wide area network (WAN). The storage device 125 may be a storage cloud such as Amazon's® Simple Storage Service (S3), Nirvanix® Storage Delivery Network (SDN), Windows® Live SkyDrive, Ironmountain's® storage cloud, Rackspace® Cloudfiles, AT&T® Synaptic Storage as a Service, Zetta® Enterprise Cloud Storage On Demand, IBM® Smart Business Storage Cloud, and Mosso® Cloud Files.

In an exemplary operation, the computing system 100 enables and manages user requests, such as the create, read, update and delete (CRUD) operations, and translates user requests into requests to the storage device 125 to retrieve and store data files.

Figure 2:
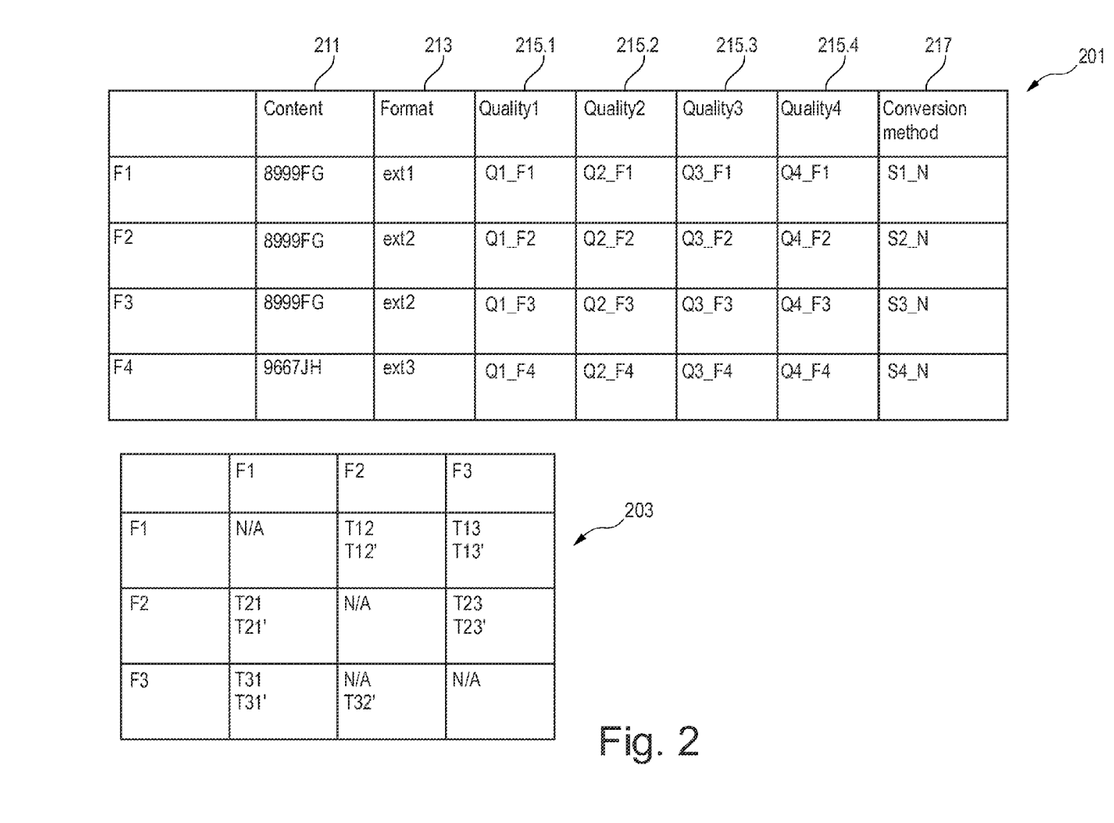
FIG. 2 illustrates tables descriptive of a set of files.

The computer device 101 may comprise the tables 201 and 203 of FIG. 2. These data structures may be resident in the system memory 105. The tables 201 and 203 comprise information indicative of a set of computer files (e.g. F1, F2, F3 and F4) having different file formats. Said information is assigned to the files using the tables 201 and 203, but it is not limited to this technique, as a variety of techniques may also be used for assigning said information to the files.

The illustrated table 201 of FIG. 2, is composed of a "Content" column 211 for storing data indicative of the content of the files F1-F4. It may store, for example, a hashID of the content of the files F1-F4. The hashID may be determined using a message digest 5 (MD5) or secure hash algorithm 1 (SHA1) or other customized hashing algorithms. The table 201 is further composed of a "Format" column 213 for storing file extension names ("ext1", "ext2" . . . "ext4") associated with each of the files F1-F4. An example format may be a media file format or compressed file format (e.g. DOC, PDF, AVI, ZIP, etc.) The table 201 is further composed of a set of "Quality" columns 215 for storing different quality indicator values for each of the files F1-F4. For example, the quality indicator value may be a resolution value, a size value of the file, and the like. The "Conversion method" column 217 of the table 201 stores data indicative of conversion methods for converting the file format of column 213 associated with each file of F1-F4 to one or more file formats of column 213. This data may indicate, for example, the software that should be invoked to perform the conversion e.g. S1_2 indicates a software that may convert the file format of F1 to a file format of F2.

Rows 219-223 show that the same content or hashID can correspond to different files F1-F3, but they indicate different file formats. Given that F1, F2 and F3 have the same content after the transformation using the matrix 203 they may be stored as a single file in the storage device 125. F4 may be stored as another file in the storage device 125.

The files F1-F4 have file formats that belong to a same format category. For example, the format category may be a compressed file format, a media file format, or an electronic mail file format. For each format category, a different set of the tables 201 and 203 may be provided.

The illustrated table 203 of FIG. 2 includes data that indicate whether the files F1-F3 are convertible to each other. F1, F2 and F3 are different files in binary with different formats, but have the same content. Each cell of the table 203 is identified by a column and row; wherein the column and the row are each indicative of one of the files F1-F3. Each cell comprises one or more flags e.g. T12. For example, a flag may refer to one or more bits that are used to store a binary value or code that has an assigned meaning. In the table 203, T12 indicates that the file format of F1 could be transformed to the file format of F2 during store process. T12' indicates that the file format of F1 could be transformed to the file format of F2 during retrieval process. T32 is N/A while T23 is present. This means that it is an asymmetric transformation between the file format of F2 and the file format of F3, also it could be regarded that file format of F2 may have higher quality than file format of F3 for the same content. T32 is N/A while T32' is preset. This means that a data quality loss may be acceptable for clients during retrieval for the same data content.

The operation of the computer system 100 will be described in details with reference to FIG. 3-4.

Figure 3:
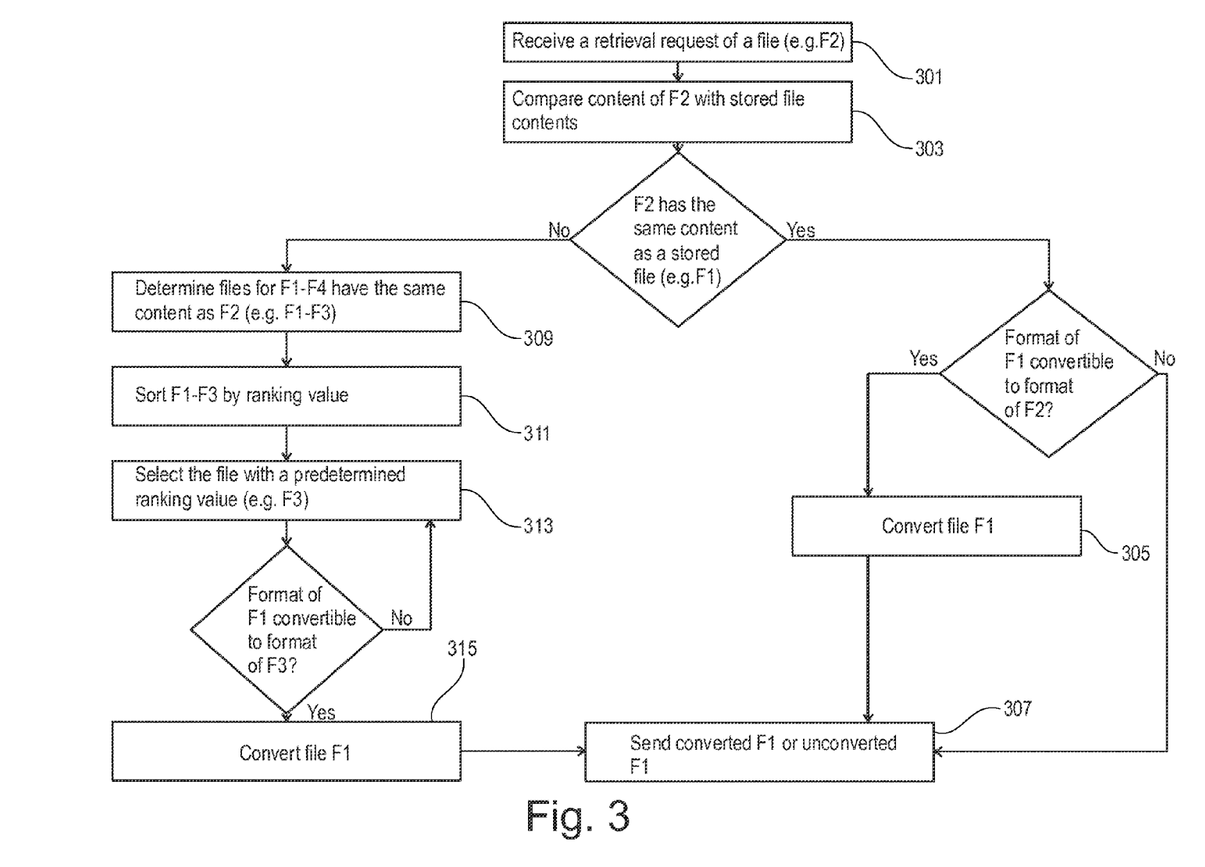
FIG. 3 is a flowchart of a method for retrieving a file.

In an exemplary operation that is illustrated in FIG. 3, the computer device 101 receives a request 301 from a user of the computing system 100, such as through the interface 115, or otherwise. The request may be a retrieval request of a file e.g. F2 of one the files F1-F4. The request is indicative of the requested file name which contains the file name extension (i.e. "exT2"). The file name extension indicates the file format of the requested file.

The computer device 101 processes the request to send back a file to the user. This may be done by comparing 303 the content of the requested file with contents of stored files in the storage device 125. For that, the computer device 101, may read the table 201 for determining the hashID associated with the requested file F2. The reading may be performed by accessing records in table 201 using an index associated with row F2 and column "Content". The determined hashID is then compared to the hashID of each of the stored files.

If the hashID of the requested file is equal to one of the hashIDs of the stored files and the stored file is one of the files F1-F4, the computer device 101 may read the table 203 to determine whether the file format of the stored file e.g. F1 is convertible to the requested file format of F2. To do so, it may access the content of the cell that corresponds to the files F2 and F1 using for example an index associated with row "F1" and column "F2". If the file format of the stored file is convertible to the requested file format, the stored file F1 with format "ext1" is converted 305 to the file F1 with the requested file format ext2 (i.e. file format of F2). Alternatively, the computer device 101 may determine 309 which files of F1-F4 have the same content as the file F2, e.g. F1 and F3. In block 311, the computer device 101 sorts the file identifiers of F1-F3 by one of the quality indicators of table 201. The quality indicator may be randomly chosen. Alternatively, the quality indicator may be included in the request. For example, in case of a compressed file format category, the user may indicate in the request that ZIP is the default quality level for archives.

In block 313, the computer device 101 selects, from the file identifiers of F1-F3, the file identifier that is associated with the highest quality indicator value e.g. file identifier of F3. If the file format of the stored file F1 is convertible to the selected file format i.e. file format "ext3" of F3, the stored file F1 with format "ext1" is converted in block 315 to the file F1 with file format "ext3". If the stored file format is not convertible to the selected file format of F3, the computer device 101 may repeat block 313 to determine a second highest quality indicator value. In this simplified case the second highest quality indicator value may be associated with file F1 which is already stored. That is the file F1 with format "ext1" may be sent back to the user.

In block 307, the computer device 101 sends back, to the user, the resulting file of one of the two above actions. The user may also be notified that the he or she may receive the same file with the same content but with different format.

Figure 4:
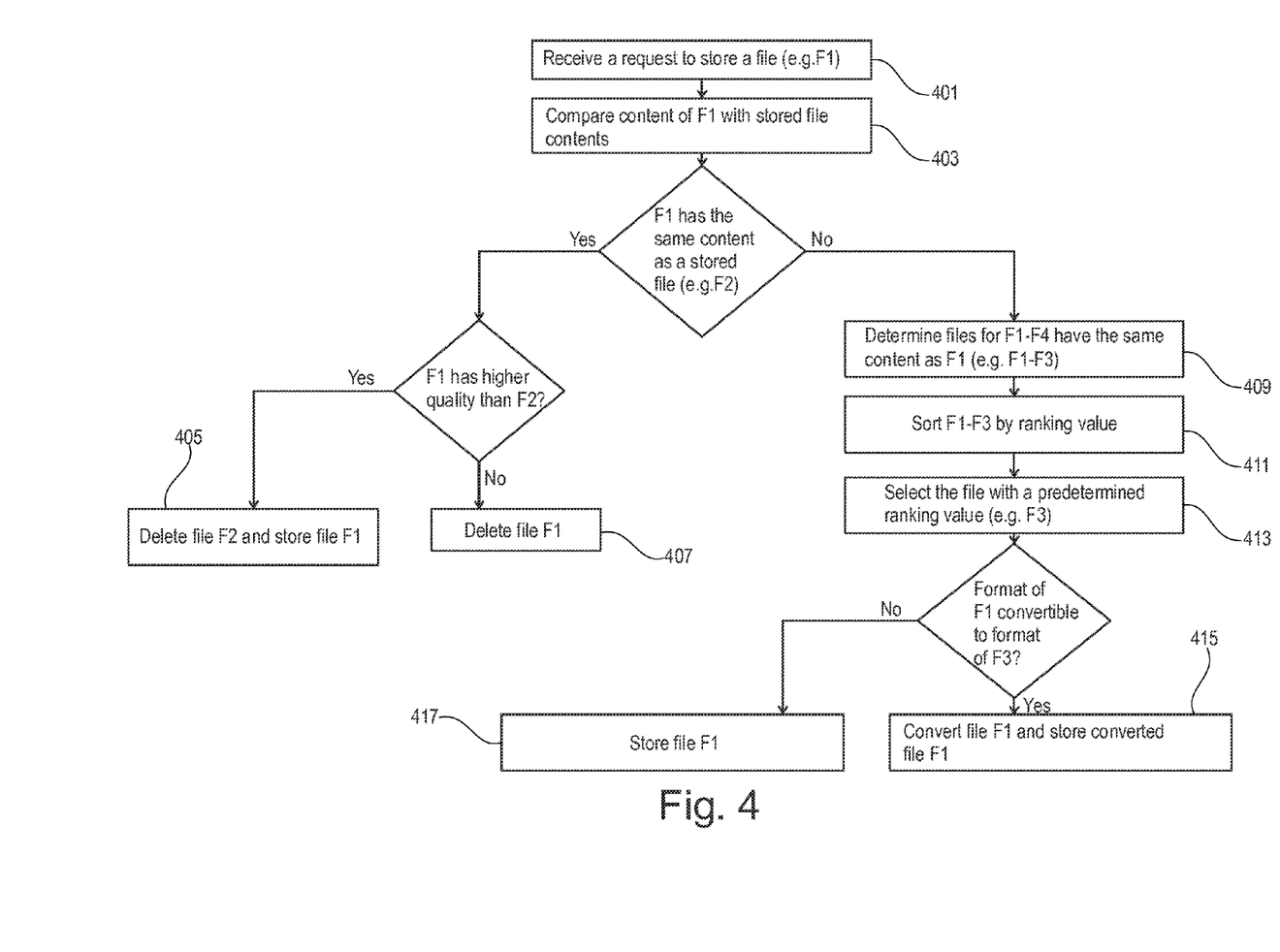
FIG. 4 is a flowchart of a method for storing a file.

In another example operation that is illustrated in FIG. 4, the computer device 101 receives a request 401, such as through the interface 115, or otherwise. The request may be a request to store a file e.g. F1 of the files F1-F4 in the storage device 125. The request is indicative of the file name of F1, which contains the file name extension. The file name extension indicates the file format of the file F1 to be stored. In block 403, the computer device 101 compares 403 the content of the file F1 (e.g. using the hashId values) with content of stored files in the storage device 125.

If the content of the file F1 is the same as a stored file content e.g. of F2, the computer device 101 may determine which one of the files F1 and F2 has the highest quality indicator value. If the file F1 has the highest quality indicator value, the computer device may delete 405 the file F2 and store the file F1, otherwise the computer device 101 may delete 407 the file F1. In the last case, the deletion is performed even if the file F2 is not convertible to the file format F1, so as to avoid duplication. The user may be notified that the file has been stored in another format than the original one.

If the file F1 does not have the same content as a stored file in the storage device 125, the computer device 101 may determine 409 files of F1-F4 that have the same content as the file F1, e.g. F2 and F3. In block 411, the computer device 101 sorts the file identifiers of F1-F3 by one of the quality indicators of table 201. In block 413, the computer device 101 may select the file e.g. F3 having a quality indicator value as specified by the user in the request. For example, the user may prefer having highest or lowest quality indicator value, depending on his/her needs. For example, in case of an electronic email format category the MIME format rather than Rich Text Format may be selected as the default quality level for emails. The computer device 101, in block 415 may read the table 203 to determine whether the file format of F1 is convertible to the file format of F3. If the file format of F1 is convertible to file format of F3, the computer device 101 may store 415 the converted file F1 with the file format "ext3" of F3, otherwise the file F1 is stored 417.

Alternatively, the sorting of the files F1-F3 may be performed using a combination of at least two quality indicator values. For example, for each file of F1-F3, the computer device 101 may calculate a weighed ratio that combines the quality indicator values $Q1\_Fi$ and $Q2\_Fi$ as follows: $W1*Q1\_Fi/W2*Q2\_Fi$ where i=1, 2, 3. The computer device 101 may then sort the files F1-F3 using the calculated ratio (which is a calculated/derived quality indicator). The quality indicators (e.g. Q1 and Q2) may be chosen depending on the group format to which the files F1-F3 belong. For example, in case the files F1-F3 belong to media files format category e.g. images, the quality indicators may be the image resolution (Q1) and the size of the image (Q2). The weights W1 and W2 may be determined depending on the computing system 100 requirements.

For example, the computing system 100 may have a recommended maximum image file size (SIZE_MAX) that can be stored in the computer device 101. In addition, a recommended image resolution (RESOL_RECO) that is suitable for the display of the computer device 101 may be defined for the computer device 101. In this case the weight W1 may be equal to W1=1/RESOL_RECO and W2=1/SIZE_MAX. The computer device 101 may then select the file (as having the highest quality indicator value) of files F1-F3 with the ratio value the closest to 1 with $W1*Q1\_Fi$ close to 1 and $W2*Q2\_Fi$ close to 1.

In another example, the combination may be a sum of at least two quality indicator values. The selection may be also based on computing system 100 requirements.

One embodiment is a computer implemented method for file storage in a storage system. The method comprises: providing data of a set of files having different file formats, the data comprising a transformation matrix indicative of a conversion between the file formats, the data further comprising descriptive information of the content of each file of the set of files; receiving a request to store in the storage system a first file having a first format, the first file belonging to the set of the files; determining whether a first descriptive information of the first file corresponds to a second descriptive information of a second file stored in the storage system; in case the first descriptive information corresponds to the second descriptive information, determining whether a second format of the second file is convertible to the first format using the transformation matrix; if the second format has a higher quality indicator value than the first format and the second format is convertible to the first format deleting the first file, otherwise storing the first file as a stored file in the storage system. The second file may be a file of the set of files. The second file may be deleted after the first file has been stored if the first format is convertible to the second format. In case the first descriptive information does not correspond to the second descriptive information, and corresponds to a third descriptive information of a non-stored third file of the set of files, the transformation matrix is used to determine whether the first format is convertible to a third format of the third file. If the first format is convertible to the third format, storing the first file in the first format or storing the first file converted to the third format as the stored file.

Some embodiments disclosed herein may have the advantage of using file formats, in addition to file content, as a classification factor for storage and de-duplication. This may eliminate redundant data and thereby improve storage utilization and reduce network data transfer, especially in a cloud storage system that contains data from different tenants.

The first, second and the third files may have different formats and thus different content qualities. This may add data quality as a differentiator to storage and de-duplication solutions, and for end users add the ability to store/retrieve higher/lower quality of their file content The de-duplication based on quality measures may enable the implementer to balance storage cost reduction versus CPU cycle cost, a trade-off which is not possible with conventional methods.

According to one embodiment, the method further comprises receiving a request to retrieve a file with a file format, the file belonging to the set of files, wherein a descriptive information of the requested file corresponds to the descriptive information of the stored file;

If the transformation matrix indicates that the format of the stored file is convertible to the format of the requested file, the stored file format is converted to the format of the requested file and sending the converted stored file. Otherwise, the unconverted stored file is sent. This may have the advantage of increasing the retrieval efficiency of files having multiple formats and the same content.

According to one embodiment, the descriptive information of each file of the set of files comprises a file identifier of the file. This embodiment further comprises assigning to each file identifier of a subset of the set of file identifiers a ranking value, wherein the subset of file identifiers comprises file identifiers associated with mutually corresponding descriptive information. This embodiment further comprises sorting the subset of file identifiers by the ranking value. The method further comprises selecting from the subset of file identifiers a file identifier associated with a predetermined ranking value for obtaining a selected file with a selected file format. This embodiment further comprises receiving a request to retrieve a file with a file format, where the file belongs to the subset of files, and descriptive information of the requested file corresponds to the descriptive information of the stored file. If the file format of the stored file is convertible to the selected file format, converting the stored file format to the selected file format and sending the converted stored file. This may increase the quality of the retrieved data.

According to one embodiment, the predetermined ranking value is the highest ranking value.

The request may be received from a user of the storage system. The request may be indicative of the predetermined ranking value. For example, depending on the user needs, a file with the lowest ranking value may be requested, in case the user wanted to perform a simple test on the file content.

According to one embodiment, determining the third file comprises assigning to each file identifier of a subset of the set of file identifiers a ranking value, wherein the subset of file identifiers comprises file identifiers associated with descriptive information that mutually correspond. This embodiment further comprises sorting by the ranking value the subset of files identifiers. This embodiment further comprises selecting, from the subset of file identifiers, the file identifier associated with the highest ranking value, and determining the third file as the file having the selected file identifier.

According to one embodiment, storing further comprises in block d) comparing the ranking values of the first file and the third file; in case the ranking value of the third file is higher storing in the storage system the converted first file, otherwise storing in the storage system the first file.

This may provide the ability to define quality measures on which the storage may be done and thus may provide high quality stored data content.

According to one embodiment, the method further comprises sending a notification message to the sender of the request, wherein the notification message is indicative of the ranking value of the stored file or of the retrieved file. Informing the sender of the request may prevent additional requests of the same file from the sender that may cause an overload of the system.

According to one embodiment, the received request is further indicative of the ranking value. Depending on the user needs, he or she may define the ranking value that is suitable for ranking his or her file content. For example, when requesting an image file, the user may consider either ranking the images using the resolution of the image or the size of the image depending on the usage he or she intends to perform with the image.

According to one embodiment, the ranking value comprises a measure of a quality of the file, wherein the quality is selected from the group comprised of a sampling rate, a resolution, a compress ratio and an information richness of the file content. A combination of these qualities and/or other qualities may also be used for the ranking.

According to one embodiment, the set of files have file formats belonging to a same format category, wherein the format category is selected from the group comprised of a compressed file format, a media file format, and an electronic mail file format.

The set of files may also belong to other format groups such as text file format, office document format etc.

According to one embodiment, wherein the request is further indicative of the format category. This may facilitate the de-duplication or the retrieval of the data file from the storage system, using the transformation matrix associated with the format category.

According to one embodiment, the descriptive information of a file comprises a hash value of the file content, wherein determining whether a first descriptive information of the first file content corresponds to a second descriptive information comprises comparing the hash value of the first file content with the hash value of the second file content.

According to one embodiment, the hash value is determined using an MD5 hash algorithm or SHA1 algorithm. Other customized hashing algorithms may also be used.

According to one embodiment, the data is indicative of at least one conversion method for converting the formats.

In another aspect, the invention relates to a computer program product comprising computer executable instructions to perform the method steps of the method of any one of the preceding embodiments.

In another aspect, the invention relates to a computer system for file storage, the computer system being adapted for: providing data of a set of files having different file formats, the data comprising a transformation matrix indicative of a conversion between the file formats, the data further comprising descriptive information of the content of each file of the set of files; receiving a request to store in a storage system of the computer system a first file having a first format, the first file belonging to the set of the files; determining whether a first descriptive information of the first file corresponds to a second descriptive information of a second file stored in the storage system; in case the first descriptive information corresponds to the second descriptive information, determining whether a second format of the second file is convertible to the first format using the transformation matrix; if the second format has a higher quality indicator value than the first format and the second format is convertible to the first format deleting the first file, otherwise storing the first file as a stored file in the storage system; in case the first descriptive information does not correspond to the second descriptive information, and corresponds to a third descriptive information of a non-stored third file of the set of files, determining whether the first format is convertible to a third format of the third file using the transformation matrix; in case the first format is convertible to the third format, storing the first file in the first format or storing the first file converted to the third format as the stored file.

A computer-readable storage medium' as used herein encompasses any tangible storage medium which may store instructions which are executable by a processor of a computing device. The computer-readable storage medium may be referred to as a computer-readable non-transitory storage medium. The computer-readable storage medium may also be referred to as a tangible computer readable medium. In some embodiments, a computer-readable storage medium may also be able to store data which is able to be accessed by the processor of the computing device. Examples of computer-readable storage media include, but are not limited to: a floppy disk, a magnetic hard disk drive, a solid state hard disk, flash memory, a USB thumb drive, Random Access Memory (RAM), Read Only Memory (ROM), an optical disk, a magneto-optical disk, and the register file of the processor. Examples of optical disks include Compact Disks (CD) and Digital Versatile Disks (DVD), for example CD-ROM, CD-RW, CD-R, DVD-ROM, DVD-RW, or DVD-R disks. The term computer readable-storage medium also refers to various types of recording media capable of being accessed by the computer device via a network or communication link. For example a data may be retrieved over a modem, over the internet, or over a local area network. Computer executable code embodied on a computer readable medium may be transmitted using any appropriate medium, including but not limited to wireless, wireline, optical fiber cable, RF, etc., or any suitable combination of the foregoing.

A computer readable signal medium may include a propagated data signal with computer executable code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

'Computer memory' or 'memory' is an example of a computer-readable storage medium. Computer memory is any memory which is directly accessible to a processor. 'Computer storage' or 'storage' is a further example of a computer-readable storage medium. Computer storage is any non-volatile computer-readable storage medium. In some embodiments computer storage may also be computer memory or vice versa.

A 'processor' as used herein encompasses an electronic component which is able to execute a program or machine executable instruction or computer executable code. References to the computing device comprising "a processor" should be interpreted as possibly containing more than one processor or processing core. The processor may for instance be a multi-core processor. A processor may also refer to a collection of processors within a single computer system or distributed amongst multiple computer systems. The term computing device should also be interpreted to possibly refer to a collection or network of computing devices each comprising a processor or processors. The computer executable code may be executed by multiple processors that may be within the same computing device or which may even be distributed across multiple computing devices.

Computer executable code may comprise machine executable instructions or a program which causes a processor to perform an aspect of the present invention. Computer executable code for carrying out operations for aspects of the present invention may be written in any combination of one or more programming languages, including an object oriented programming language such as Java, Smalltalk, C++ or the like and conventional procedural programming languages, such as the "C" programming language or similar programming languages and compiled into machine executable instructions. In some instances the computer executable code may be in the form of a high level language or in a pre-compiled form and be used in conjunction with an interpreter which generates the machine executable instructions on the fly.

The computer executable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block or a portion of the blocks of the flowchart, illustrations, and/or block diagrams, can be implemented by computer program instructions in form of computer executable code when applicable. It is further under stood that, when not mutually exclusive, combinations of blocks in different flowcharts, illustrations, and/or block diagrams may be combined. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As will be appreciated by one skilled in the art, aspects of the present invention may be embodied as an apparatus, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer executable code embodied thereon.

It is understood that one or more of the aforementioned embodiments may be combined as long as the combined embodiments are not mutually exclusive.

The invention claimed is:

1. A computer-implemented method for storing a file into a storage system, the method comprising:
   determining that a descriptive information describing content of a first file corresponds to a descriptive information describing content of a second file;
   in response to determining that a format of the first file is convertible to a format of the second file using a transformation matrix, comparing a first quality indicator value associated with the format of the first file to a second quality indicator value associated with the format of the second file;
   determining that the first quality indicator value associated with the format of the first file is higher than the second quality indicator value associated with the format of the second file; and
   storing the first file into the storage system.

2. The method of claim 1, wherein determining that the descriptive information describing content of the first file corresponds to the descriptive information describing content of the second file further comprises:
   comparing a hash value in the descriptive information describing content of the first file with a hash value in the descriptive information describing content of the second file.

3. The method of claim 1, further comprising:
   determining that the descriptive information describing content of the first file does not correspond to the descriptive information describing content of the second file but instead corresponds to a descriptive information describing content of a third file; and determining that the format of the first file is convertible to a format of the third file using the transformation matrix; and converting the first file to the format of the third file and storing the converted first file into the storage system.

4. The method of claim 3, further comprising:

determining that the format of the first file is not convertible to the format of the third file; and storing the first file into the storage system.

5. The method of claim 1, further comprising:

in response to receiving a request for the first file in a selected file format, converting the first file to the selected file format based on the first file being convertible to the selected file format.

6. The method of claim 5, wherein the selected file format belongs to a format category corresponding to at least one of a compressed file format, a media file format, and an electronic mail file format.

7. The method of claim 1, wherein storing the first file further comprises:

storing a ranking value assigned to the format of the first file.

8. The method of claim 7, wherein the ranking value comprises a measure of a quality of the stored first file, and the quality is selected from the group comprised of a sampling rate, a resolution, a compression ratio, and an information richness of the file content.

9. A computer program product for storing a file into a storage system, the computer program product comprising a non-transitory computer readable storage medium having program code embodied therewith, the program code executable by a processor to perform a method, the method comprising:

determining that a descriptive information describing content of a first file corresponds to a descriptive information describing content of a second file;

in response to determining that a format of the first file is convertible to a format of the second file using a transformation matrix, comparing a first quality indicator value associated with the format of the first file to a second quality indicator value associated with the format of the second file;

determining that the first quality indicator value associated with the format of the first file is higher than the second quality indicator value associated with the format of the second file; and storing the first file into the storage system.

10. The computer program product of claim 9, wherein determining that the descriptive information describing content of the first file corresponds to the descriptive information describing content of the second file further comprises:

comparing a hash value in the descriptive information describing content of the first file with a hash value in the descriptive information describing content of the second file.

11. The computer program product of claim 9, wherein the method performed by the program code further comprises:

determining that the descriptive information describing content of the first file does not correspond to the descriptive information describing content of the second file but instead corresponds to a descriptive information describing content of a third file; and determining that the format of the first file is convertible to a format of the third file using the transformation matrix; and converting the first file to the format of the third file and storing the converted first file into the storage system.

12. The computer program product of claim 11, wherein the method performed by the program code further comprises:

determining that the format of the first file is not convertible to the format of the third file; and storing the first file into the storage system.

13. The computer program product of claim 9, wherein the method performed by the program code further comprises:

in response to receiving a request for the first file in a selected file format, converting the first file to the selected file format based on the first file being convertible to the selected file format.

14. The computer program product of claim 9, wherein storing the first file further comprises:

storing a ranking value assigned to the format of the first file.

15. A computer system for storing a file into a storage system, the computer system comprising:

a memory having instructions stored on; and a processor configured to execute the instructions, the system configured to:

determine that a descriptive information describing content of a first file corresponds to a descriptive information describing content of a second file;

in response to determining that a format of the first file is convertible to a format of the second file using a transformation matrix, compare a first quality indicator value associated with the format of the first file to a second quality indicator value associated with the format of the second file;

determine that the first quality indicator value associated with the format of the first file is higher than the second quality indicator value associated with the format of the second file; and store the first file into the storage system.

16. The computer system of claim 15, wherein, to determine that the descriptive information describing content of the first file corresponds to the descriptive information describing content of the second file, the system is further configured to:

compare a hash value in the descriptive information describing content of the first file with a hash value in the descriptive information describing content of the second file.

17. The computer system of claim 15, wherein the system is further configured to:

determine that the descriptive information describing content of the first file does not correspond to the descriptive information describing content of the second file but instead corresponds to a descriptive information describing content of a third file;

determine that the format of the first file is convertible to a format of the third file using the transformation matrix; and convert the first file to the format of the third file and store the converted first file into the storage system.

* * * * *